Patented Aug. 8, 1939

2,168,315

UNITED STATES PATENT OFFICE 2,168,315

METHOD FOR THE PURIFICATION OF PETROLEUM MAHOGANY SULPHONATES

Manuel Blumer, Butler, Pa., assignor to L. Sonneborn Sons, Inc., a corporation of Delaware No Drawing. Application January 19, 1937, Serial No. 121,287

12 Claims. (Cl. 260—504)

This invention relates to a new and useful method for the purification of petroleum mahogany sulphonates.

The conventional refining treatment of certain lubricating oil distillates derived from petroleum includes the application of fuming sulphuric acid. This reacts with the oil, producing a black sludge containing unreacted sulphuric acid and certain types of sulphonic acids. Though the concentration of $SO_3$ in the fuming acid may vary considerably, a 20% fuming acid is employed in the majority of cases. As a result of the high degree of sulphonation obtained in the acid treatment, a considerable amount of sulphonic acids is produced. These are principally of two types, that is, the so-called water-soluble type predominantly contained in the sludge and the so-called oil-soluble type predominantly found in the oil to the extent of a few percent. The acid application is regulated in the manner well known in the art to produce the desired sulphonation reaction and in general temperatures not exceeding 140° F. are preferred. The acids contained in the sludge, while limitedly soluble, if at all, in hydrocarbon oils, are highly water-soluble, imparting to their aqueous solution a dark-green color, and being for this reason generally referred to as "green petroleum sulphonic acids". The acids left in solution in the oil impart a reddish color to the oil and for this reason are generally referred to as "mahogany petroleum sulphonic acids". After the separation of the oil from the acid sludge the mahogany sulphonic acids are usually recovered from the oil in the form of their salts in accordance with ordinary refining methods comprising conversion of the acids into salts by direct neutralization of the acid treated oil followed by suitable extractions. These salts or mahogany sulphonates constitute a valuable by-product of petroleum refining, being used for a variety of purposes but primarily as emulsifying agents.

The mahogany sulphonic acids or mahogany sulphonates constitute a material well defined in its character and properties though as yet unknown in its composition. It is assumed to comprise a series of closely related sulphonic acids or sulphonates as the case may be with a varying number of sulpho groups. Inasmuch, however, as the material obtained in the refining of petroleum oils is substantially uniform and well identifiable I have termed and will refer to the neutralized sulphonic acids for the purpose of brevity simply as "mahogany sulphonate" or "mahogany sulphonates".

One object of my invention comprises inter alia the removal of inorganic salts from crude mahogany sulphonate stock as it is customarily obtained in the acid treatment of petroleum distillates and containing varying amounts of entrained oil. The oil content of such crude stock is usually up to 40% or more, while the inorganic salts, particularly sulphates and sulphites, are as a rule present in amounts of approximately 9% and frequently much higher. For many purposes it is not only desirable but requisite to substantially remove these admixed inorganic salts from the mahogany sulphonate stock. The removal of the entrained oil, in the majority of cases, is not necessary and its presence is in some instances even desirable.

I have discovered that a mahogany sulphonate stock containing entrained oil can be obtained in a substantially pure condition from crude mahogany sulphonate stock by the use of organic solvents capable of removing, in the presence of water, the inorganic salts from the crude stock. The solvents that are suitable in accordance with my invention are preferably such as will not dissolve inorganic salts or at least not to an appreciable degree or if they possess some solvent action upon inorganic salts, are preferably such as will exercise a greater solvent action upon the oil admixed with the mahogany sulphonate, than upon the inorganic salts. The solvents should be liquid at a temperature of 130° F. and preferably at normal temperatures. They should be preferably such that the affinity of the solvent for the mahogany sulphonate containing entrained oil is greater than the affinity of the solvent for water. Suitable solvents for instance are dioxan, glycol mono-methyl ether, (marketed as "Methyl Cellosolve"), glycol mono-ethyl ether (marketed as "Cellosolve"), ethyl ether, isopropyl ether, butyl ether, amyl ether, aniline, nitrobenzene, dichlor ethyl ether, furfural, benzyl alcohol, glycol mono-butyl ether—(marketed as "Butyl Cellosolve"), methyl acetate, ethyl acetate, amyl acetate, acetic acid, methyl alcohol, ethyl alcohol, propyl alcohol, isopropyl alcohol, butyl alcohol, isobutyl alcohol, amyl alcohol, secondary amyl alcohol, acetone, gasoline, benzol, etc. In general, any suitable aliphatic or aromatic, including heterocyclic and mixed aliphatic-aromatic, hydrocarbon, alcohol, aldehyde, ketone, acid, ester, ether, amino-, nitro-, halogen compound and their derivatives, as well as mixtures thereof, of the afore-described character and nature may be used in accordance with my invention. The boiling range of the solvents that may be used in my new method should be sufficiently low to permit their removal in the customary manner such as by distillation in vacuo or otherwise without causing thereby a partial decomposition of the mahogany sulphonate. It is of advantage that the boiling points be so low and preferably between 95° and 300° F. as to enable the removal of the solvent at ordinary temperatures without the necessity of resorting to vacuum distillation.

In the practical application of my method the crude mahogany sulphonate stock containing entrained oil is contacted with the solvent and a certain amount of water as thoroughly as possible and preferably with the aid of agitation. Though not necessary it is of advantage to thereafter heat the resulting mix from 120° to 130° F. for the purpose of facilitating stratification into layers and the removal of the inorganic salt from the mahogany sulphonate stock. The free alkali is then neutralized and the neutralized mix left to settle until two layers have formed. One of these layers and usually the upper one constitutes an oily layer and is primarily composed of mahogany sulphonate, oil and solvent, whereas the other is an aqueous layer comprising predominantly an aqueous salt solution. Thus, the inorganic salts originally present in the crude mahogany sulphonate stock are taken up and removed by the water.

Depending upon the particular solvent used and its relative solubility in or miscibility with water, lesser or greater amounts of the solvent are found in the water. In some cases where the solvent is completely miscible with water in all proportions as for instance when using dioxan, glycol mono-methyl ether, glycol mono-ethyl ether, etc., so much of such solvent is taken up by the water that the latter has lost most of its solvent power for inorganic salts, for which reason the inorganic salts removed from the mahogany sulphonate stock will not be dissolved by the aqueous medium but will instead be precipitated as solid salt particles. In such case the aqueous layer will comprise primarily solvent and water.

After the separation of the aqueous layer from the oily layer the solvent is removed from the mahogany sulphonate stock by distillation and may be thus recovered for re-use. After the solvent has been flashed off, the mahogany sulphonate stock is obtained substantially pure, that is, substantially free from inorganic salts in excess of 3% and in most instances in excess of 1%, which in the majority of cases is sufficiently pure for commercial purposes.

In accordance with my invention it is of advantage to control the pH of the mix and I have found that if the pH appreciably exceeds 9 (being on the alkaline side) it is highly difficult in large scale operations and frequently impossible to obtain a product substantially free from inorganic salt content in excess of 3%, whereas a pH of 9 or below 9 and above 3 and preferably a pH of 7 or between 7 and 3 yields a substantially pure end product. This becomes of particular importance with regard to the extent of neutralization with a suitable acid to which the mahogany sulphonate stock must be subjected for the successful purification, should it possess too high a degree of alkalinity, which is usually the case as the result of the free alkali normally present therein. A neutralization with phenol phthalein as indicator will show a neutral point at a pH of approximately 7.5 to 8 and sometimes even as high as 9. If methyl red or methyl orange are used as indicator the end point of the neutralization appears at a pH of 6 to 7 or of 3 to 4 respectively. A neutralization with the last mentioned indicators therefore will be preferable as yielding a product of still less salt content than the final product obtained when the neutralization has been effected to the phenol phthalein end point.

A further advantage of the control of the pH within the indicated limits resides in the fact that the speeds with which the inorganic salts will be removed and the mix will stratify into layers is considerably greater than that at high pH ranges.

Concerning the proportions of solvent and water that I may use in accordance with my invention for the removal of the inorganic salts from a mahogany sulphonate stock containing entrained oil, I have found that satisfactory results can be obtained by maintaining a ratio of mahogany sulphonate stock plus entrained oil to solvent in excess of 0.5 and preferably between 2.0 and 3.0, a ratio of mahogany sulphonate stock plus entrained oil to water in excess of 0.5 and preferably between 1.5 and 6.0 and a ratio of solvent to water in excess of 0.5 and preferably between 0.8 and 4.0. For economical reasons, however, I prefer to use such proportions within the defined limits as will permit the greatest concentration of mahogany sulphonate stock plus entrained oil and the least amount of solvent, and have found it of advantage to utilize a ratio of mahogany sulphonate stock plus entrained oil to solvent of 2, a ratio of mahogany sulphonate stock plus entrained oil to water of 2 and a ratio of solvent to water of 1 which in percentage proportions is equivalent to 50% mahogany sulphonate stock, plus entrained oil, 25% solvent and 25% water.

It is of course understood that when using as the solvent an acid such as acetic acid or an acid reacting liquid such as an acidified solvent, the neutralization of the mix may be dispensed with provided the acidity is sufficient to neutralize the alkalinity present ab initio in the mahogany sulphonate stock. Though I prefer to neutralize the alkalinity present in the mahogany sulphonate stock after the addition of the solvent and water, I may effectuate this neutralization before such addition and circumstances as well as particular practices may sometimes require this deviation from the preferred procedure.

The foregoing description is by way of illustration and not of limitation and I am not to be limited to any details but only by the appended claims in which I have endeavored to claim broadly all inherent novelty.

I claim:

1. Method of purifying petroleum mahogany sulphonates containing entrained oil which comprises contacting crude mahogany sulphonates containing entrained oil and inorganic salts with an organic solvent and water, while maintaining a pH range between 3.0 and 9.0 and a ratio of mahogany sulphonate containing entrained oil and inorganic salts to solvent and to water as well as a ratio of solvent to water in excess of 0.5 to thereby form a first liquid layer substantially free from inorganic salts and containing organic solvent and mahogany sulphonate plus entrained oil and a second liquid layer containing water, thereafter separating said first liquid layer from said second liquid layer and finally removing said solvent from said first liquid layer to thereby recover mahogany sulphonate plus entrained oil substantially free from inorganic salts, said solvent being substantially liquid at ordinary temperatures and possessing a boiling point sufficiently low to permit its removal without substantial decomposition of mahogany sulphonate, the affinity of the solvent for the crude mahogany sulphonate containing entrained oil being greater than the affinity of the solvent for water.

2. Method in accordance with claim 1 in which said solvent has a boiling point substantially between 95 and 300° F. and in which said pH range is substantially maintained between 3.0 and 7.0.

3. Method of purifying petroleum mahogany sulphonates containing entrained oil which comprises contacting crude mahogany sulphonates containing entrained oil and inorganic salts with an organic solvent and water while substantially maintaining a pH range between 3.0 and 9.0, and a ratio of mahogany sulphonate containing entrained oil and inorganic salts to solvent between 2 and 3, to water between 1.5 and 6 and a ratio of solvent to water between 0.8 and 4.0, to thereby form a first liquid layer substantially free from inorganic salts and containing organic solvent and mahogany sulphonate plus entrained oil, and a second liquid layer containing water, thereafter separating said first liquid layer from said second liquid layer and finally removing said solvent from said first liquid layer to thereby recover mahogany sulphonate plus entrained oil substantially free from inorganic salts, said solvent being substantially liquid at ordinary temperatures and possessing a boiling point sufficiently low to permit its removal without substantial decomposition of mahogany sulphonate, the affinity of the solvent for the crude mahogany sulphonate containing entrained oil being greater than the affinity of the solvent for water.

4. Method in accordance with claim 3 in which said solvent has a boiling point substantially between 95 and 300° F., in which the pH range is substantially maintained between 3 and 7 and in which the ratio of mahogany sulphonate containing entrained oil and inorganic salts to solvent and to water is 2 and the ratio of solvent to water is 1.

5. Method of purifying petroleum mahogany sulphonates containing entrained oil which comprises contacting crude mahogany sulphonates containing entrained oil and inorganic salts with an organic solvent and water while substantially maintaining a pH range between 3.0 and 9.0, and a ratio of mahogany sulphonate containing entrained oil and inorganic salts to solvent between 2 and 3, to water between 1.5 and 6 and a ratio of solvent to water between 0.8 and 4.0, to thereby form a first liquid layer substantially free from inorganic salts and consisting predominantly of organic solvent and mahogany sulphonate plus entrained oil and a second liquid layer consisting predominantly of an aqueous solution of said inorganic salts thereafter separating said first liquid layer from said second liquid layer and finally removing said solvent from said first liquid layer to thereby recover mahogany sulphonate plus entrained oil substantially free from inorganic salts, said solvent being substantially liquid at ordinary temperatures and possessing a boiling point sufficiently low to permit its removal without substantial decomposition of mahogany sulphonate, the affinity of the solvent for the crude mahogany sulphonate containing entrained oil being greater than the affinity of the solvent for water.

6. Method in accordance with claim 5 in which said solvent has a boiling point substantially between 95 and 300° F., in which the pH range is substantially maintained between 3 and 7 and in which the ratio of mahogany sulphonate containing entrained oil and inorganic salts to solvent and to water is 2 and the ratio of solvent to water is 1.

7. Method of purifying petroleum mahogany sulphonates containing entrained oil which comprises contacting crude mahogany sulphonates containing entrained oil and inorganic salts with a substantially water miscible organic solvent and water while substantially maintaining a pH range between 3.0 and 9.0, and a ratio of mahogany sulphonate containing entrained oil and inorganic salts to solvent between 2 and 3, to water between 1.5 and 6 and a ratio of solvent to water between 0.8 and 4.0, to thereby form a first liquid layer substantially free from inorganic salts and containing organic solvent and mahogany sulphonate plus entrained oil and a second liquid layer containing water and solvent and a remainder of precipitated undissolved inorganic salts thereafter separating said first liquid layer from said second liquid layer and from said undissolved inorganic salts and finally removing said solvent from said first liquid layer to thereby recover mahogany sulphonate plus entrained oil substantially free from inorganic salts, said solvent being substantially liquid at ordinary temperatures and possessing a boiling point sufficiently low to permit its removal without substantial decomposition of mahogany sulphonate, the affinity of the solvent for the crude mahogany sulphonate containing entrained oil being greater than the affinity of the solvent for water.

8. Method in accordance with claim 7 in which said solvent has a boiling point substantially between 95 and 300° F., in which the pH range is substantially maintained between 3 and 7 and in which the ratio of mahogany sulphonate containing entrained oil and inorganic salts to solvent and to water is 2 and the ratio of solvent to water is 1.

9. Method of purifying petroleum mahogany sulphonates containing entrained oil which comprises contacting crude mahogany sulphonates containing entrained oil and inorganic salts with an organic solvent and water at a temperature of 120 to 130° F., while substantially maintaining a pH range between 3.0 and 9.0, and a ratio of mahogany sulphonate containing entrained oil and inorganic salts to solvent between 2 and 3, to water between 1.5 and 6 and a ratio of solvent to water between 0.8 and 4.0, to thereby form a first liquid layer substantially free from inorganic salts and containing organic solvent and mahogany sulphonate plus entrained oil, and a second liquid layer containing water, thereafter separating said first liquid layer from said second liquid layer and finally removing said solvent from said first liquid layer to thereby recover mahogany sulphonate plus entrained oil substantially free from inorganic salts, said solvent being substantially liquid at ordinary temperatures and possessing a boiling point sufficiently low to permit its removal without substantial decomposition of mahogany sulphonate, the affinity of the solvent for the crude mahogany sulphonate containing entrained oil being greater than the affinity of the solvent for water.

10. Method in accordance with claim 9 in which said solvent has a boiling point substantially between 95 and 300° F., in which the pH range is substantially maintained between 3 and 7 and in which the ratio of mahogany sulphonate containing entrained oil and inorganic salts to solvent and to water is 2 and the ratio of solvent to water is 1.

11. Method of purifying petroleum mahogany sulphonates containing entrained oil which comprises contacting crude mahogany sulphonates containing entrained oil and inorganic salts with amyl alcohol and water, while substantially maintaining a pH range between 3.0 and 9.0 and a ratio of mahogany sulphonate containing entrained oil and inorganic salts to said amyl alcohol between 2 and 3, to water between 1.5 and 6 and a ratio of said alcohol to water between 0.8 and 4.0, to thereby form a first liquid layer substantially free from inorganic salts and containing mahogany sulphonate plus entrained oil in solution in said amyl alcohol and a second liquid layer containing water, thereafter separating said first liquid layer from said second liquid layer, and finally removing said amyl alcohol from said first liquid layer to thereby obtain mahogany sulphonate plus entrained oil substantially free from inorganic salts.

12. Method in accordance with claim 11 in which the pH range is substantially maintained between 3 and 7 and in which the ratio of mahogany sulphonate containing entrained oil and inorganic salts to said alcohol and to water is 2 and the ratio of said alcohol to water is 1.

MANUEL BLUMER.